United States Patent Office 2,802,852
Patented Aug. 13, 1957

2,802,852

PROCESSES OF CLEAVING SILICON-TO-CARBON BONDS

Philip D. George, Schenectady, N. Y., assignor to General Electric Company, a corporation of New York No Drawing. Application March 24, 1955,
Serial No. 496,601

17 Claims. (Cl. 260—448.2)

This invention relates to the cleavage of silicon-carbon bonds and particularly to the cleavage of such bonds in which the carbon atom is a part of an alkyl group, and to methods and reagents for effecting cleavage of such bonds.

The methods used heretofore to achieve cleavage of silicon-carbon bonds in which the carbon atom is a part of an alkyl group have utilized strong reagents at elevated temperatures since the silicon-carbon bond is generally unreactive. The cleavage products obtained by prior methods are not readily separated into their separate components by distillation and have necessitated the use of aqueous separation processes.

Other cleavage processes and reagents have been utilized which will cleave a substituted alkyl group from a silicon atom in preference to an alkyl group. Such processes and reagents are disadvantageous when it is desired to preserve the substituted alkyl group on the silicon atom while removing an alkyl group from the same silicon atom. In addition many of the substituted groups on the substituted alkyl group which it is desired to leave on the silicon atom are sensitive to aqueous solutions and accordingly by separation processes would necessarily follow prior art cleavage processes and accordingly these separation processes have been difficult and often unsuccessful in obtaining the desired final products.

Accordingly, it is an object of the present invention to provide new and improved reagents and methods for breaking silicon-carbon bonds and particularly silicon-carbon bonds in which the carbon is a part of an alkyl group.

Another object of the present invention is to provide cleavage reagents for breaking silicon-carbon bonds of the type set forth which can be applied to a wider range of compounds than the reagents used heretofore and which will preferentially cleave bonds in which the carbon is a part of an alkyl group and leave attached to the silicon substituted alkyl groups.

Yet another object of the present invention is to provide new and improved reagents and methods for effecting cleavage of silicon-carbon bonds of the type set forth which operate at lower temperatures; more specifically it is an object of the present invention to provide new and improved cleavage methods and reagents which are successfully operable at substantially room temperature.

Still another object of the invention is to provide improved reagents and methods for breaking silicon-carbon bonds of the type set forth which do not require an excess of reagent and therefore leave undisturbed carbon-functional groupings sensitive to excess cleavage reagent.

Still another object of the present invention is to provide cleavage reagents and methods for breaking silicon-carbon bonds of the type set forth which produce readily distillable products that do not require aqueous treatment for separation.

A further object of the invention is to provide cleavage methods and reagents which when applied to a monosilane compound substituted with four saturated alkyl groups, at least one of which alkyl groups is substituted, will preferentially cleave the silicon to carbon bond involving a carbon forming part of an alkyl group.

A still further object of the invention is to provide cleavage methods and reagents which when applied to compounds set forth in the preceding object, do not cause rearrangement of the substituted alkyl group.

The above objects and advantages are obtained according to the present invention by reacting a hydrogen halide in which the halide has a molecular weight at least as great as chlorine in the presence of a Friedel-Crafts type catalyst with silanes fully substituted with saturated groups having a terminal carbon atom attached to silicon in which at least one of the groups is an alkyl group to remove an alkyl group therefrom.

In general any hydrogen halide in which the halogen has an atomic weight at least equal to chlorine is suitable for the purposes of this invention. A preferred hydrogen halide and the hydrogen haide which will be used in the examples is hydrogen chloride. A preferred Friedel-Crafts type catalyst useful in the present invention is anhydrous aluminum trichloride.

The cleavage reaction of the present invention has wide applicability and in general may be applied to silanes which are fully substituted with alkyl groups. One or more of the alkyl groups may be further substituted so long as at least one unsubstituted alkyl group remains. The substituted alkyl groups may be substituted with alkyl groups, aryl groups, halogen atoms, carboxyl groups, unsubstituted and substituted amines, and even other silanes. The reaction will be illustrated herein as applied to silanes in which four saturated alkyl groups are each attached directly to a single silicon atom by silicon-carbon bonds.

By the present reaction one of the silicon-carbon bonds is broken to remove an unsubstituted and saturated alkyl group to form the corresponding monohalogensilane as one of the reaction products. The reaction can be controlled so that substantially only one silicon-carbon bond is broken on each silane molecule. There are no rearrangement products formed in any of the reactions studied. The reaction products are readily separated by simple distillation operations.

In order better to illustrated the present invention, several specific examples will now be given. It is to be understood that these examples are given for purposes of illustration and not by way of limitation.

*Example 1*

There was placed in a 200-ml. three-neck flask 88 grams, 1.0 mole, of tetramethylsilane and 2.6 grams, 0.02 mole, of anhydrous aluminum chloride. The three-neck flask was fitted with a magnetic stirrer, a gas bubbler, a thermometer and a reflux condenser topped by a Dry-Ice cold finger that was connected to a wet-gas-test-meter through a concentrated sulfuric acid scrubber and four water scrubbers. Stirring was begun and heat was applied to maintain the reaction mixture at a reflux temperature of 25° C. Hydrogen chloride was then introduced through a concentrated sulfuric acid scrubber. 11 grams of hydrogen chloride were passed into the reaction mixture over a period of one hour without any evolution of water-insoluble gas and without any rise in temperature. After passage of hydrogen chloride for another hour, evolution of water-insoluble gas began and the reaction temperature began to rise. During the next three hours 0.897 cubic feet (measured at standard temperature and pressure) of water-insoluble gas, later identified as methane, was evolved. The total methane evolved amounted to 1.03 moles. The reaction temperature reached 55° C.

where it remained constant until the rate of methane evolution became nil. A total of 73 grams, 2.0 moles, of hydrogen chloride was used. At the end of the run, substantially all of the aluminum chloride had gone into solution.

The liquid product recovered weighed 104.5 grams and was subjected to fractional distillation yielding 86.4 grams of a product which was identified as trimethylchlorosilane. The yield of trimethylchlorosilane was 80% of the theoretical yield. The 86.4 gram sample of trimethylchlorosilane had the following physical properties: B. P. 55.5–56.5° C. and $n_D^{20}$ 1.3879–86. This product was further refined by distillation to provide 67.4 grams of product which had the following physical properties: B. P. 56–56.5° C. and $n_D^{20}$ 1.3881–2. The identity of the product was verified by an infrared spectrum.

In Example I above, a large excess of hydrogen chloride was used due to the low residence time for the hydrogen chloride in the apparatus used. Much of the hydrogen chloride escapes unreacted but in properly designed reactors all of the hydrogen chloride should react and hence no extra hydrogen chloride is needed to complete cleavage of the starting material. A small amount of dimethyldichlorosilane was produced indicating a side reaction involving a cleavage of a second silicon-carbon bond. Cleavage of more than one silicon-carbon bond can be substantially eliminated by using only the theoretically required amount of hydrogen chloride.

It is believed that the reactions set forth in Example I proceed according to the following equation:

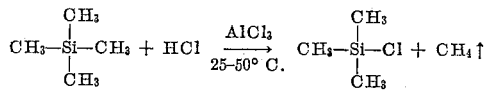

Instead of using hydrogen chloride as a cleavage agent, other hydrogen halides having molecular weights greater than hydrogen chloride may be used. Other Friedel-Crafts catalysts besides aluminum trichloride can be used. For example, ferric chloride, stannic chloride, boron trichloride and zinc chloride can be used. Any other Friedel-Crafts type catalyst which will not permanently react with either of the cleavage products may be used.

The pressure in the above reaction must be sufficiently high to keep at least some of the compound in a liquid state. The temperature is limited primarily by the stability of the compound toward the aluminum chloride catalyst.

It has been found that the cleavage reaction of the present invention can be applied successfully to silanes which are fully substituted with alkyl groups in which one or more of the alkyl groups is substituted. For example, one of the alkyl groups may be substituted with a halogen atom such as chlorine. When applying the cleavage reaction of the present invention to this type of compound, it has been found that one of the unsubstituted and saturated alkyl groups is preferentially removed from a silicon atom. Furthermore it has been found that no rearrangement products resulting from the rearrangement of the substituted group on the alkyl groups are formed. The following is a specific example of a cleavage reaction of this type:

*Example II*

There was placed in a reactor of the type described above in Example I, 138 grams, 1.13 moles, of chloromethyltrimethylsilane and 2 grams, 0.015 mole, of anhydrous aluminum chloride. This mixture was cooled to 5–10° C. and kept at that temperature throughout the introduction of 59 grams, 1.61 moles, of anhydrous hydrogen chloride over a period of 6 hours. The reaction mass was stirred continuously during the addition of the hydrogen chloride.

During the reaction, 23.9 liters (measured at standard temperature and pressure) of water-insoluble gas was collected. The gas was identified by mass spectrometric analysis as methane. This volume of methane represents 1.07 moles of methane. When the evolution of methane had ceased, the flow of hydrogen chloride was stopped. In order to precipitate the aluminum chloride which was dissolved in the reaction mass, 8 grams of phosphorous oxychloride was added. The phosphorous oxychloride formed a complex with the aluminum chloride and thereby precipitated the aluminum chloride from the reaction products. The aluminum chloride can also be removed by distilling of the reaction products.

The total crude reaction product weighs 171 grams. The product was filtered and subjected to fractional distillation giving a 93% yield of crude chloromethyldimethylchlorosilane. There was isolated from this crude product 131.0 grams, 0.92 moles, of purified chloromethyldimethylchlorosilane. The final purified product had the following physical properties: B. P. 114.5–115° C.; $n_D^{20}$ 1.4370–8. The purified product represented an 81% yield.

The product was further identified as chloromethyldimethylchlorosilane by an infrared spectrum. The amount of hydrolyzable chloride in the product calculated on the empirical formula $C_3H_8Cl_2Si$ is 24.8.%

Actual experimental determinations for hydrolyzable chloride gave the following results: 25.1%, 24.8%, 24.8%.

The above determinations, including the boiling point, the hydrolyzable chloride present, and the infrared spectrum, indicated that very little or no rearrangement products were formed and that very little or no products resulting from a cleavage of two silicon-carbon bonds were present. More specifically, substantially no trimethylchlorosilane, dimethylethylchlorosilane or chloromethylethyldichlorosilane were formed. The chloromethyl group remained intact and attached to the silicon atom.

It is believed that the reaction of Example II above proceeds according to the following equation:

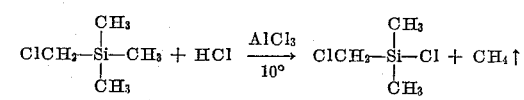

The pressure for carrying out the above reaction must be sufficiently high to maintain at least some of the compound being cleaved in the liquid state. The temperature is limited primarily by the stability of the halogen substituted compound toward the catalyst and for best results it is desirable to maintain a low temperature in order to eliminate the rearrangement reaction. More specifically, it is preferred to keep the temperature below room temperature or in the order of 0° C. to 20° C. The temperature may be carried even higher if the particular compound being treated is not appreciably rearranged in the presence of the catalyst at the higher temperature.

In another reaction carried out similar to Example II above, only a slight excess of hydrogen chloride was used. The reaction did not go to completion but the results were substantially the same in other respects. The incompleteness of this reaction is due to the low residence time of the hydrogen chloride in the reaction mixture. Some of the hydrogen chloride escapes unreacted in the apparatus described but in a different design of reactor all of the hydrogen chloride can react with the starting material and hence no excess hydrogen chloride is needed for complete cleavage.

In another modification of the reaction of Example II above, no external cooling was applied to the reaction mixture during the introduction of the hydrogen chloride. As a result, the temperature of the reaction mixture rose to the reflux point, the product boiling at 56–100° C. The product obtained by this reaction contained approximately a 15% yield of chloromethyldimethylchlorosilane and other materials arising through rearrangement of the starting material.

The reaction of the present invention is equally applicable to the cleavage of silicon-carbon bonds in which the carbon forming part of the bond is also a portion of a higher alkyl group. For example, the reaction was successfully applied to tetraethylsilane.

*Example III*

A round-bottom flask was fitted with a gas-inlet tube and connected to a gas collection reservoir through a reflux condenser. There was placed in the flask 7.23 grams, 0.05 mole, of tetraethylsilane and 0.08 gram, 0.0006 mole, of anhydrous aluminum chloride. The reaction mixture was heated to the reflux temperature of about 150° C. and approximately 0.05 mole of anhydrous hydrogen chloride was bubbled through the reaction mixture. A water-insoluble gas was steadily evolved and was later identified by its infrared spectrum as ethane. The recovered liquid product boiled at 145° C. Distillation of the product yielded 90% triethylchlorosilane having the following properties: $n_D^{20}$ 1.4308–1.4311. The identity of the product as triethylchlorosilane was confirmed by its infrared spectrum. Further identification was provided by checking the compound for its chlorine content. Triethylchlorosilane having the empirical formula $C_6H_{15}ClSi$ should contain 23.6% chlorine. An analysis of the product disclosed that it contained 24.4% chlorine.

The reaction of the present invention in general can be applied to any silane which is fully substituted with alkyl groups. The alkyl groups may or may not be substituted with other groups. When the silane is fully substituted with alkyl groups, the alkyl groups may be straight chain or branched, may be alike or may all be different or combinations of different alkyl groups.

One or more but not all of the alkyl groups may also be substituted with an aryl group.

A class of silane compounds to which the present invention is particularly suited is that in which one or more but not all of the alkyl groups are substituted with one or more halogen atoms. The halogen may be fluorine, chlorine, bromine or iodine. Examples of such compounds are trimethylsilyl compounds containing a chlorine atom substituted on the alpha carbon atom of a fourth group attached to the silyl compound such as $Me_3SiCHClMe$ and $Me_3SiCClMe_2$. Higher substituted compounds can also be treated by the present reaction methods and reagents to cleave an unsubstituted methyl group including $Me_2Si(CH_2Cl)_2$, $MeSi(CH_2Cl)_3$, $Me_3SiCHCl_2$, $Me_3SiCRCl_2$ and $Me_3SiCCl_3$. An unsubstituted alkyl group is preferentially split off instead of a halogen substituted alkyl group even when the halogen atom is moved out as far as the epsilon carbon in the substituted alkyl group.

Other types of compounds on which the reaction of the present invention may be used are compounds in which other functional groups besides halogen are substituted on one or more but not all of the alkyl groups. For example one of the alkyl groups may be substituted with a carboxyl group as for example in $$Me_3SiCH_2CH_2CO_2H$$

or $Me_3SiCH_2CH_2CH_2CO_2H$. The substituent group may be also an amine which in turn may be substituted or unsubstituted. Examples of such compounds are the following: $Me_3SiCH_2CH_2NH_2$, $(Me_3SiCH_2CH_2)CHNH_2$, 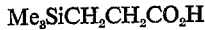, $(Me_3SiCH_2)_2NH$, and

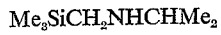

It will be seen that there has been provided new and improved reagents and methods for breaking silicon-carbon bonds in which the carbon is a part of an alkyl group. The cleavage reagents can be applied to a very wide range of compounds due to their qualitatively and quantitatively broad solubility spectrum. The reagents and methods of the present invention can produce effective cleavage at relatively low temperatures such, for example, as room temperature or even lower. Good yields from the cleavage reaction are obtained without the use of excess cleavage reagent and accordingly carbon-functional groupings sensitive to excess cleavage reagent are undisturbed. The products, in general, are distillable and can be separated readily without treatment in aqueous solution. The cleavage reaction is carried out without rearrangement of other substituent groups on the silicon atom.

Although certain specific examples have been given for purposes of illustration, it is to be understood that various changes and modifications can be made in the present invention without departing from the spirit and scope thereof. Accordingly, the invention is to be limited only as set forth in the following claims.

What is claimed is:

1. The method of treating monosilanes fully substituted with saturated groups having a terminal carbon atom attached to silicon in which at least one of the groups is a lower alkyl group to remove a lower alkyl group comprising reacting the monosilanes with a hydrogen halide in which the halide has a molecular weight at least as great as chlorine in the presence of a Friedel-Crafts catalyst.

2. The method of treating monosilanes fully substituted with saturated groups having a terminal carbon atom attached to silicon in which at least one of the groups is a lower alkyl group to remove a lower alkyl group comprising reacting the monosilanes with a hydrogen halide in which the halide has a molecular weight at least as great as chlorine in the presence of a Friedel-Crafts catalyst, and thereafter removing an alkyl compound derived from the lower alkyl group from the reaction mixture.

3. The method of treating monosilanes fully substituted with saturated groups having a terminal carbon atom attached to silicon in which at least one of the groups is a lower alkyl group to remove a lower alkyl group comprising reacting the monosilanes with hydrogen chloride in the presence of a Friedel-Crafts catalyst.

4. The method of treating monosilanes fully substituted with saturated groups having a terminal carbon atom attached to silicon in which at least one of the groups is a lower alkyl group to remove a lower alkyl group comprising reacting the monosilanes with a hydrogen halide in which the halide has a molecular weight at least as great as chlorine in the presence of anhydrous aluminum trichloride.

5. The method of treating monosilanes fully substituted with saturated groups having a terminal carbon atom attached to silicon in which at least one of the groups is a lower alkyl group to remove a lower alkyl group comprising reacting the silanes with hydrogen chloride in the presence of anhydrous aluminum trichloride.

6. The method of treating monosilanes fully substituted with lower alkyl groups to remove an alkyl group comprising reacting the silanes with a hydrogen halide in which the halide has a molecular weight at least as great as chlorine in the presence of a Friedel-Crafts catalyst.

7. The method of treating monosilanes fully substituted with saturated groups having a terminal carbon atom attached to silicon in which at least one of the groups is an alkyl group substituted with a halogen and at least one of the groups is a lower alkyl group to remove a lower alkyl group comprising reacting the monosilane with a hydrogen halide in which the halide has a molecular weight at least as great as chlorine in the presence of a Friedel-Crafts catalyst.

8. The method of treating monosilanes fully substituted with saturated groups having a terminal carbon atom attached to silicon in which at least one of the groups is an alkyl group substituted with halogen and at least one of the groups is a lower alkyl group to remove a lower alkyl group comprising reacting the monosilane with hydrogen chloride in the presence of a Friedel-Crafts catalyst.

9. The method of treating monosilanes fully substituted with saturated groups having a terminal carbon atom attached to silicon in which at least one of the groups is an alkyl group substituted with halogen and at least one of the groups is a lower alkyl group to remove a lower alkyl group comprising reacting the monosilane with a hydrogen halide in which the halide has a molecular weight at least as great as chlorine in the presence of aluminum chloride.

10. The method of treating monosilanes fully substituted with saturated groups having a terminal carbon atom attached to silicon in which at least one of the groups is an alkyl group substituted with halogen and at least one of the groups is a lower alkyl group to remove a lower alkyl group comprising reacting the monosilane with hydrogen chloride in the presence of anhydrous aluminum trichloride.

11. The method of treating monosilanes fully substituted with saturated groups having a terminal carbon atom attached to silicon in which at least one of the groups is an alkyl group substituted with halogen and at least one of the groups is a lower alkyl group to remove a lower alkyl group comprising reacting the monosilane with hydrogen chloride in the presence of anhydrous aluminum chloride at a temperature from about 0° C. to about 20° C.

12. The method of treating monosilanes fully substituted with saturated groups having a terminal carbon atom attached to silicon in which at least one of the groups is an alkyl group substituted with an aryl group and at least one of the groups is a lower alkyl group to remove a lower alkyl group comprising reacting the silanes with a hydrogen halide in which the halide has a molecular weight at least as great as chlorine in the presence of a Friedel-Crafts catalyst.

13. The method of treating monosilanes fully substituted with saturated groups having a terminal carbon atom attached to silicon in which at least one of the groups is an alkyl group substituted with a carboxyl group and at least one of the groups is a lower alkyl group to remove a lower alkyl group comprising reacting the silanes with a hydrogen halide in which the halogen has a molecular weight at least as great as chlorine in the presence of a Friedel-Crafts catalyst.

14. The method of treating monosilanes fully substituted with saturated groups having a terminal carbon atom attached to silicon in which at least one of the groups is an alkyl group substituted with an amine group and at least one of the groups is a lower alkyl group to remove a lower alkyl group comprising reacting the monosilanes with a hydrogen halide in which the halide has a molecular weight at least as great as chlorine in the presence of a Friedel-Crafts catalyst.

15. The method of effecting cleavage of a silicon-carbon bond in tetramethylsilane comprising reacting the tetramethylsilane with hydrogen chloride in the presence of aluminum chloride at a temperature of about 20° C. to about 55° C., and thereafter recovering trimethylchlorosilane as a principal product.

16. The method of effecting demethylation of chloromethyltrimethylsilane comprising reacting the chloromethyltrimethylsilane with hydrogen chloride in the presence of aluminum chloride at a temperature of about 0° C. to about 20° C., and thereafter separating chloromethyldimethylchlorosilane from the reaction mixture as a principal product.

17. The method of effecting cleavage of a silcon-carbon bond in tetraethylsilane comprising reacting tetraethylsilane with hydrogen chloride in the presence of aluminum chloride, and thereafter recovering triethylchlorosilane from the reaction mixture as the principal product.

References Cited in the file of this patent

Chem. Abstracts, vol. 47 (1953) col. 9345g.
Stock et al.: Berichte, vol. 52 (1919) pages 709, 710.